(12) United States Patent
Ohba et al.

(10) Patent No.: US 8,876,394 B2
(45) Date of Patent: Nov. 4, 2014

(54) ROLLING BEARING WITH SEAL

(71) Applicant: Keihin Corporation, Tokyo (JP)

(72) Inventors: Tomoaki Ohba, Tochigi (JP); Takuya Usami, Tochigi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 13/846,589

(22) Filed: Mar. 18, 2013

(65) Prior Publication Data

US 2013/0259415 A1    Oct. 3, 2013

(30) Foreign Application Priority Data

Mar. 30, 2012  (JP) ................................. 2012-082332
Sep. 19, 2012  (JP) ................................. 2012-205823

(51) Int. Cl.
| | |
|---|---|
| F16C 33/76 | (2006.01) |
| F16J 15/34 | (2006.01) |
| F02D 9/10 | (2006.01) |
| F16C 33/78 | (2006.01) |
| F16K 1/22 | (2006.01) |
| F16C 19/06 | (2006.01) |

(52) U.S. Cl.
CPC .............. *F16C 33/767* (2013.01); *F02D 9/106* (2013.01); *F16C 2360/22* (2013.01); *F16C 33/7823* (2013.01); *F16C 19/06* (2013.01); *F16K 1/22* (2013.01); *F16C 33/7856* (2013.01); *F16C 2361/91* (2013.01)
USPC .......................................... 384/484; 277/402

(58) Field of Classification Search
CPC ............. F16C 33/7823; F16C 33/7866; F16C 33/7853; F16C 33/7856
USPC ................. 384/484, 485, 448, 447, 481, 607; 277/349, 351, 353, 394, 402, 549
See application file for complete search history.

(56) References Cited

U.S. PATENT DOCUMENTS

| | | | | |
|---|---|---|---|---|
| 2,353,988 A | * | 7/1944 | Batesole et al. | 277/380 |
| 2,755,113 A | * | 7/1956 | Baumheckel | 277/383 |
| 2,915,345 A | * | 12/1959 | Workman | 277/575 |
| 3,752,543 A | * | 8/1973 | Schmidt | 384/484 |
| 3,854,734 A | * | 12/1974 | West | 277/565 |

(Continued)

FOREIGN PATENT DOCUMENTS

JP          2004-263734 A       9/2004

*Primary Examiner* — Alan B Waits
(74) *Attorney, Agent, or Firm* — Arent Fox LLP

(57) ABSTRACT

In a rolling bearing with seal, an annular lip supporting portion having a larger thickness than that of a seal lip is formed on an inner periphery side of a seal member; the seal lip protruding on an inner peripheral surface of the lip supporting portion has: a cylindrical seal surface being in close contact with an outer peripheral surface of an inner race; and an inner side surface at least part of which in a region from an inner end of the seal surface to reach the lip supporting portion stands upright from the inner end of the seal surface in a direction perpendicular to a generating line of the outer peripheral surface of the inner race; and a width of the seal surface in an axial direction is set to be larger than a height of the seal lip in a radial direction. Accordingly, it is possible to provide a rolling bearing with seal with a simple structure, which is capable of maintaining a normal seal pressure against an inner race of a seal lip even when large negative pressure or positive pressure acts on the seal lip, thus preventing leakage of grease inside the bearing.

2 Claims, 3 Drawing Sheets

(56) References Cited

U.S. PATENT DOCUMENTS

| | | | |
|---|---|---|---|
| 3,994,545 A * | 11/1976 | Van Dorn | 384/482 |
| 4,304,412 A * | 12/1981 | Ladin | 277/353 |
| 4,309,063 A * | 1/1982 | Weis | 384/482 |
| 4,323,287 A * | 4/1982 | Stella et al. | 384/484 |
| 4,399,998 A * | 8/1983 | Otto | 277/552 |
| 4,605,319 A * | 8/1986 | Korenhof | 384/484 |
| 5,026,178 A * | 6/1991 | Ballhaus | 384/448 |
| 5,649,772 A * | 7/1997 | Schlereth et al. | 384/484 |
| 6,471,409 B2 * | 10/2002 | Nakamura | 384/484 |
| 7,927,018 B2 * | 4/2011 | Heim et al. | 384/448 |
| 2002/0012485 A1 * | 1/2002 | Zauner et al. | 384/484 |
| 2004/0170346 A1 * | 9/2004 | Komeda et al. | 384/479 |
| 2004/0208409 A1 * | 10/2004 | Kitamura et al. | 384/484 |
| 2005/0008272 A1 * | 1/2005 | Bhat et al. | 384/477 |
| 2011/0129176 A1 * | 6/2011 | Koma et al. | 384/484 |
| 2012/0223266 A1 * | 9/2012 | Furukoshi | 251/305 |

* cited by examiner

ROLLING BEARING WITH SEAL

BACKGROUND OF THE INVENTION

1. Field of the Invention

The present invention relates to an improvement of a rolling bearing with seal comprising: an inner race; an outer race surrounding the inner race; a large number of rolling members arranged in an annular form and interposed between the inner and outer races; and a pair of annular seal members disposed between the inner and outer races in such a manner as to cover opposite sides of a group of the rolling members, wherein an attachment bead to be fixed to the outer race is formed on an outer periphery of each of the seal members, and a seal lip rotatably and slidably being in close contact with an outer peripheral surface of the inner race is formed on an inner periphery of each of the seal members.

2. Description of the Related Art

Such a rolling bearing with seal is, as disclosed in Japanese Patent Application Laid-open No. 2004-263734, interposed between a partition wall, between two chambers having different internal pressures, and a rotary shaft penetrating the partition wall. The rolling bearing with seal is capable of preventing pressure shift between the two chambers while securing smooth rotation of the rotary shaft.

Meanwhile, in the seal member of the rolling bearing with seal described in Japanese Patent Application Laid-open No. 2004-263734 above, the seal lip being in close contact with the outer peripheral surface of the inner race is formed in such a frusto-conical shape as to extend toward an outer side of the inner race while extending inward in a radial direction of an inner race. For this reason, when a large negative pressure is generated in the chamber which the seal lip faces, the negative pressure acts on an outer peripheral surface of the seal lip with the frusto-conical shape, trying to float up the seal lip away from the outer peripheral surface of the inner race. This weakens a sealing pressure of the seal lip against the inner race, possibly causing grease inside the bearing from flowing out.

SUMMARY OF THE INVENTION

The present invention has been made in view of the above-described circumstances, and an object of the present invention is to provide the rolling bearing with seal with a simple structure, which is capable of maintaining a normal seal pressure against an inner race by preventing a seal lip from falling down even when large negative pressure or positive pressure acts on the seal lip, thus preventing leakage of grease inside the bearing.

In order to achieve the object, according to a first feature of the present invention, there is provided a rolling bearing with seal comprising: an inner race; an outer race surrounding the inner race; a plurality of rolling members arranged circumferentially and interposed between the inner and outer races; and a pair of annular seal members disposed between the inner and outer races in such a manner as to cover opposite sides of a group of the rolling members, wherein an attachment bead to be fixed to the outer race is formed on an outer periphery of each of the seal members, wherein a seal lip rotatably and slidably being in close contact with an outer peripheral surface of the inner race is formed on an inner periphery of each of the seal members, wherein an annular lip supporting portion having a larger thickness than that of the seal lip is formed on the inner periphery side of the seal member, wherein the seal lip protruding on an inner peripheral surface of the lip supporting portion has: a cylindrical seal surface being in close contact with the outer peripheral surface of the inner race; and an inner side surface at least part of which in a region from an inner end of the seal surface to reach the lip supporting portion stands upright from the inner end of the seal surface in a direction perpendicular to a generating line of the outer peripheral surface of the inner race, and wherein a width of the seal surface in an axial direction is set to be larger than a height of the seal lip in a radial direction. Here, the rolling member corresponds to a ball 32 in embodiments of the present invention, which will be described later.

With the first feature of the present invention, the seal lip protruding on the inner peripheral surface of the lip supporting portion of the seal member is configured such that the cylindrical seal surface having a larger width in the axial direction than the height of the seal lip in the radial direction is supported on the outer peripheral surface of the inner race. Moreover, the seal lip has the inner side surface at least part of which in the region form the inner end of the seal surface to reach the lip supporting portion stands upright from the inner end of the seal surface in the direction perpendicular to the generating line of the outer peripheral surface of the inner race. The seal lip thus exhibits a large stiffness. Accordingly, even when an axial load due to a pressure difference between the inner and outer sides of the seal member is applied to the seal lip, the seal lip does not fall down, and maintains a favorable close contact state of the seal surface against the outer peripheral surface of the inner race. Therefore, it is possible to surely prevent grease inside the bearing from flowing out, and to provide a rolling bearing with seal having a high durability with a simple structure.

According to a second feature of the present invention, in addition to the first feature, the seal lip is formed to have the inner side surface and an outer side surface standing upright respectively from the inner end and an outer end of the seal surface in the direction perpendicular to the generating line of the outer peripheral surface of the inner race and reaching the inner peripheral surface of the lip supporting portion.

With the second feature of the present invention, the seal lip is formed to have the inner side surface and the outer side surface standing upright respectively from the inner end and the outer end of the seal surface in the direction perpendicular to the generating line of the outer peripheral surface of the inner race and reaching the inner peripheral surface of the lip supporting portion. Accordingly, when an axial load due to a pressure difference between the inner and outer sides of the seal member is applied to the seal lip, the axial load acts on the seal lip as a shearing force in the axial direction. The seal lip having the rectangular sectional shape exhibits a large stiffness against the shearing force, making it possible to surely prevent the seal lip from falling down.

According to a third feature of the present invention, in addition to the first or second feature, an annular recess portion recessed to immediately above the seal lip is formed in an outer side surface of the lip supporting portion.

With the third feature of the present invention, the annular recess portion recessed to immediately above the seal lip is formed in the outer side surface of the lip supporting portion. Accordingly, the supporting stiffness of the lip supporting portion for the seal lip can be appropriately reduced by the depth of the recess portion, making it possible to adjust a friction torque between the seal lip and the inner race. Therefore, a change in an allowable rotational torque of the inner race can be dealt with.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Figure 1:
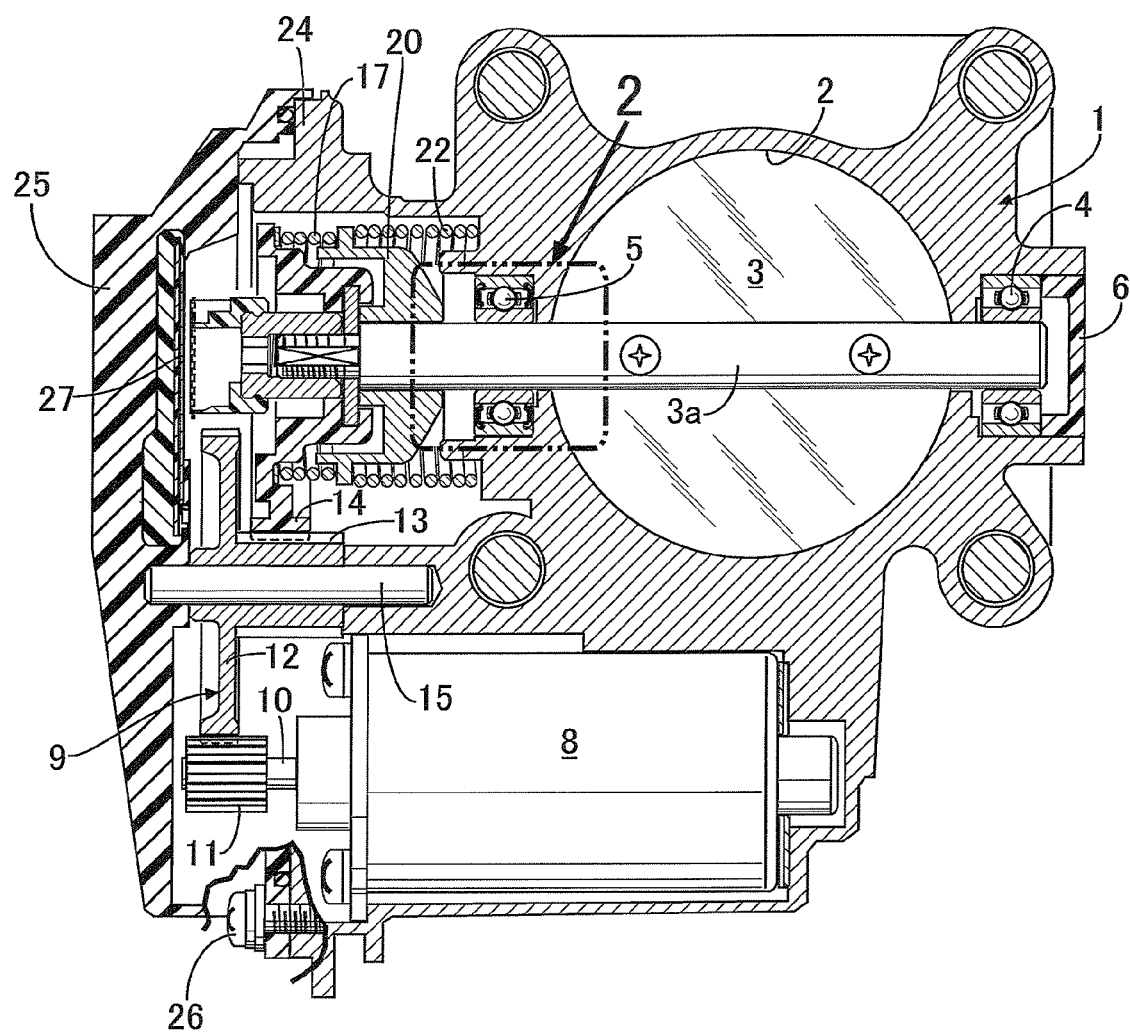
FIG. 1 is a sectional view of an intake control device of an engine, including a rolling bearing with seal according to a first embodiment of the present invention.

Embodiments of the present invention will be described below on the basis of preferred embodiments of the present invention which are shown in the drawings.

In FIG. 1, a throttle body 1, which constitutes a part of an intake system of an engine for a vehicle such as a two-wheeled motor vehicle and an automobile, has an intake passage 2, which communicates with an intake port of the engine, at a center portion of the throttle body 1. A valve stem 3a of a butterfly-type throttle valve 3 configured to open and close the intake passage 2 is rotatably supported on both left and right sidewalls of the throttle body 1 by a pair of rolling bearings 4 and 5. In this connection, the rolling bearing 5 on the left side, in particular, is a rolling bearing with seal, which will be described in detail later.

A cap 6 configured to cover a right end portion of the throttle valve 3 and the rolling bearing 4 is fitted in the right sidewall of the throttle body 1. In addition, a left end portion of the valve stem 3a protrudes outward from the left sidewall of the throttle body 1, and an electric motor 8 configured to drive the throttle valve 3 to open and close is coupled to the protruding end portion of the valve stem 3a through a reduction gear mechanism 9. The reduction gear mechanism 9 includes: a primary drive gear 11 fixedly attached on an output shaft 10 of the electric motor 8; a primary follower gear 12 rotatably supported on an intermediate shaft 15 and meshing with the primary drive gear 11; a secondary drive gear 13 formed integrally on one side of the primary follower gear 12; and a sector-type secondary follower gear 14 fixedly attached to the left end portion of the valve stem 3a and meshing with the secondary drive gear 13. The reduction gear mechanism 9 is capable of transmitting a rotation of the output shaft 10 of the electric motor 8 to the valve stem 3a while reducing the speed thereof in two stages, thus opening and closing the throttle valve 3. The valve stem 3a, the output shaft 10, and the intermediate shaft 15 are arranged such that axes of these are perpendicular to an axis of the intake passage 2 and in parallel with one another.

A closing spring 17 configured to bias the secondary follower gear 14 in a closing direction of the throttle valve 3 is connected to the secondary follower gear 14. In addition, a default lever 20 is rotatably supported on the valve stem 3a adjacent to the secondary follower gear 14. An opening spring 22 having a spring force larger than that of the closing spring 17 and configured to bias the default lever 20 in an opening direction of the throttle valve 3 is connected to the default lever 20. When turned in the opening direction of the throttle valve 3 by the biasing force of the opening spring 22, the default lever 20 drives the throttle valve 3 in the opening direction via the secondary follower gear 14. A default stopper bolt (not shown) configured to receive the default lever 20 to stop an opening of the throttle valve 3 from an idling opening degree thereof at a predetermined default opening degree is attached to the throttle body 1. Accordingly, during the operation of the engine, when the electric motor 8 becomes incapable of being supplied with electricity, the throttle valve 3 is maintained at the default opening degree by the biasing force of the opening spring 22. Thus, the engine is supplied with an amount of intake air that allows the vehicle to drive at a very low speed to a maintenance factory.

A control case 24 housing the electric motor 8, the reduction gear mechanism 9, and the like is formed integrally on the left sidewall of the throttle body 1. A case cover 25 made of a synthetic resin and configured to close an opening portion of the control case 24 is joined to a left end surface of the control case 24 with a bolt 26. A throttle sensor 27 configured to detect an angle of rotation of the valve stem 3a as the opening degree of the throttle valve 3 is provided in the case cover 25. In addition, a ventilating hole (not shown) for ventilating an inside of the control case 24 in order to prevent dew condensation in the control case 24 is provided in the case cover 25, and thus the inside of the control case 24 is always kept at atmospheric pressure.

Figure 2:
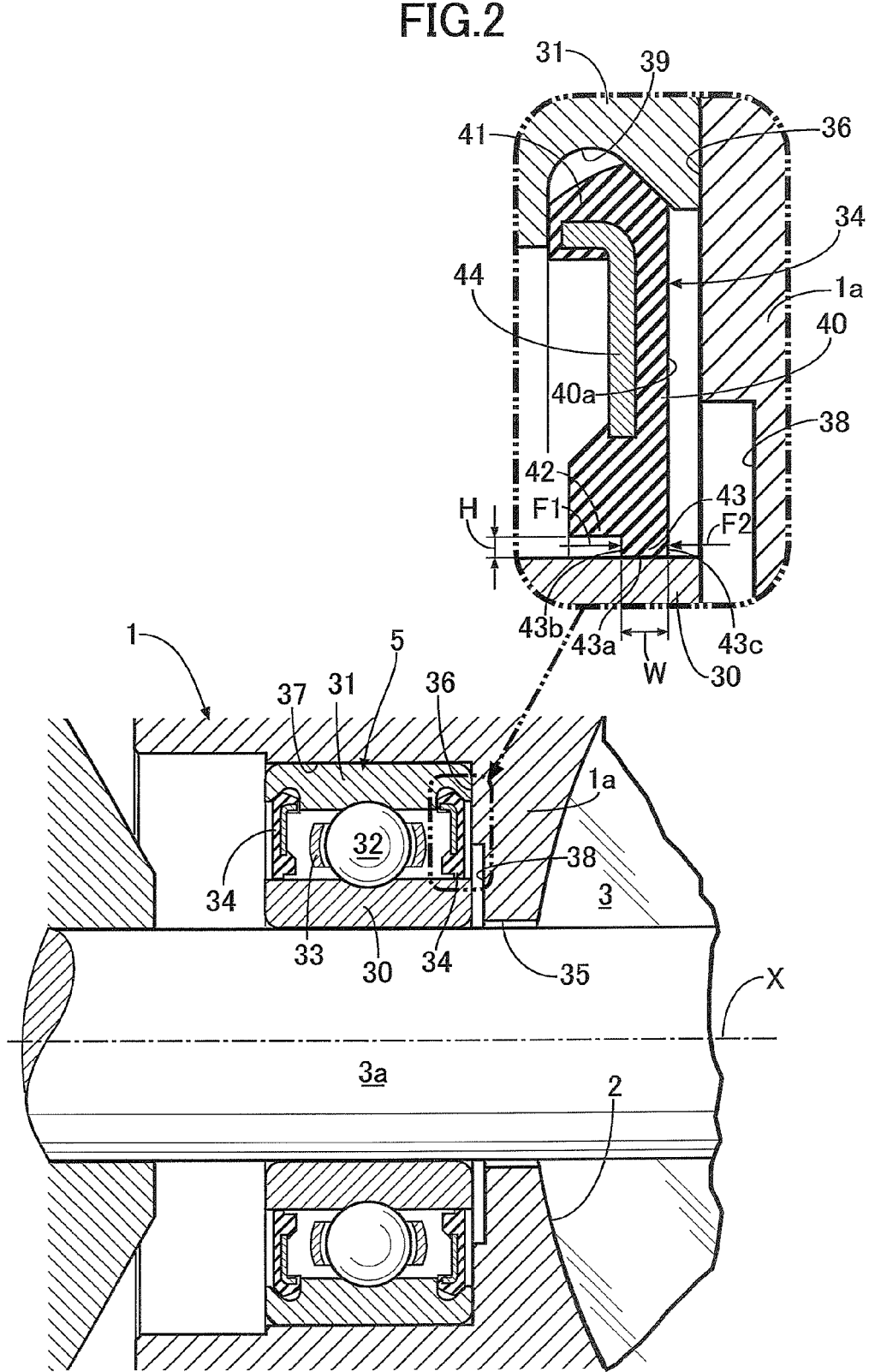
FIG. 2 is an enlarged view of a part 2 in FIG. 1.

Now, referring to FIG. 2, the rolling bearing 5 with seal on the control case 24 side, which rotatably supports the valve stem 3a, will be described.

The rolling bearing 5 with seal includes: an inner race 30; an outer race surrounding the inner race 30; a plurality of balls 32 arranged circumferentially and interposed between the inner and outer races 30 and 31; a retainer 33 retaining the group of balls 32; and a pair of annular seal members 34 disposed between the inner and outer races 30 and 31 in such a manner as to cover the group of the balls 32 from opposite sides. Grease for lubrication (not shown) is applied on and around the group of the balls 32.

On the other hand, a stem hole 35, through which the valve stem 3a penetrates, and a bearing housing 37, which is coaxially continuous to the stem hole 35 through a step portion 36 facing the control case 24 side, are formed in a sidewall 1a, on the control case 24 side, of the throttle body 1. An annular clearance recess portion 38 is provided to the step portion 36.

The outer race 31 of the rolling bearing 5 with seal is press-fitted into the bearing housing 37. The inner race 30 is press-fitted onto an outer periphery of the valve stem 3a. At this time, contact between the inner race 30 and the sidewall 1a is avoided by the clearance recess portion 38.

The annular seal member 34 is made of rubber or an elastomer, and includes: a plate-shaped wall 40; an annular attachment bead 41 bulging from an outer peripheral portion of the plate-shaped wall 40 toward the group of the balls 32; an annular lip supporting portion 42 having a large thickness and bulging from an inner peripheral portion of the plate-shaped wall 40 toward the group of the balls 32; and a seal lip 43 protruding on an inner peripheral surface of the lip supporting portion 42. A reinforcement ring 44 made of steel is buried in from the lip supporting portion 42 to the attachment bead 41. The attachment bead 41 is fitted and fixed in an annular attachment groove 39 provided in an inner peripheral surface of the outer race 31.

In addition, the seal lip 43 is formed in a rectangular sectional shape having: a cylindrical seal surface 43a being in close contact with an outer peripheral surface of the inner race 30 with a certain interference; and an inner side surface 43b and an outer side surface 43c standing upright respectively from an inner end and an outer end of the seal surface 43a in a direction perpendicular to a generating line of the outer peripheral surface of the inner race 30 and reaching the inner peripheral surface of the lip supporting portion 42. The fact that the inner side surface 43b and the outer side surface 43c each stand upright in the direction perpendicular to the generating line of the outer peripheral surface of the inner race 30 may be rephrased as the inner side surface 43b and the outer side surface 43c stand upright in a direction perpendicular to a center axis X of the inner race 30.

In the seal lip 43, a width W of the seal surface 43a in an axial direction is set to be larger than a height H of the seal lip 43 in a radial direction, and a cross section of the seal lip 43 is a rectangle having a longer side along the axial direction.

The outer side surface 43c of the seal lip 43 is located to be flush with or near an outer side surface 40a of the plate-shaped wall 40 while the inner side surface 43b thereof is located in an intermediate portion of the lip supporting portion 42 in the axial direction. Accordingly, the seal lip 43 is offset from the center portion of the lip supporting portion 42 in the axial direction toward an outer side of the inner race 30, and an inner peripheral end of the reinforcement ring 44 is located in an outer peripheral portion of the lip supporting portion 42 so as not to reduce an elasticity of the seal lip 43.

In this way, the pair of left and right seal members 34 disposed between the inner race 30 and the outer race 31 have a symmetrical structure, which makes it unnecessary to restrict a mounting direction of the rolling bearing 5 with seal when the rolling bearing 5 with seal is mounted to the bearing housing 37 and the valve stem 3a.

Next, operation of the first embodiment will be described. During the operation of the engine, the throttle valve 3 is driven by the electric motor 8 through the reduction gear mechanism 9 to open and close the intake passage 2, thereby controlling the amount of intake air of the engine. At this time, since the valve stem 3a of the throttle valve 3 is supported by the pair of left and right rolling bearings 4 and 5, the rotation of the valve stem 3a, that is, the opening and closing operation of the throttle valve 3 can be smoothly performed. Moreover, since the rolling bearing 5 with seal on the control case 24 side in particular includes the pair of seal members 34 covering opposite sides of the group of the balls 32, the seal members 34 is capable of preventing pressure shift between the intake passage 2 and the control case 24, and preventing the grease inside the rolling bearing 5 with seal from flowing out.

Meanwhile, during the operation of the engine, a positive pressure and a negative pressure are alternately generated inside the intake passage 2 because of intake pulsation of the engine. The pulsating pressure passes through the stem hole 35 and the clearance recess portion 38 and acts on the outer side surface of the seal member 34 on the intake passage 2 side in the rolling bearing 5 with seal. Here, the inside of the control case 24 is always at atmospheric pressure. Accordingly, an outward axial load F1 and an inward axial load F2 associated with a differential pressure between the pulsating pressure (the positive pressure and the negative pressure) and the atmospheric pressure are alternately applied to the seal member 34 on the intake passage 2 side in the rolling bearing 5 with seal, trying to bend the seal lip 43, which is most flexible in the seal member 34, in particular.

Since the cylindrical seal surface 43a having the width W in the axial direction larger than the height H of the seal lip 43 in the radial direction is supported on the outer peripheral surface of the inner race 30, the seal lip 43 can exhibit a large stiffness. Accordingly, even when an axial load due to the pressure difference between the inner and outer sides of the seal member 34 is applied to the seal lip 43, the seal lip 43 does not fall down, and maintains a favorable close contact state of the seal surface 43a against the outer peripheral surface of the inner race 30. Therefore, it is possible to surely prevent the grease inside the bearing 5 from flowing out, and to obtain the rolling bearing 5 with seal having a high durability with a simple structure.

In addition, particularly the seal lip 43 has the rectangular sectional shape having the inner side surface 43b and the outer side surface 43c standing upright respectively from the inner end and the outer end of the seal surface 43a in the direction perpendicular to the generating line of the outer peripheral surface of the inner race 30. Accordingly, the outward axial load F1 and the inward axial load F2 act on the seal lip 43, of the seal member 34, as a shearing force in the axial direction. The seal lip 43 having the rectangular sectional shape, which is supported by the lip supporting portion 42 with a large thickness, exhibits a large stiffness against the shearing force, making it possible to surely prevent the seal lip 43 from falling down.

Figure 3:
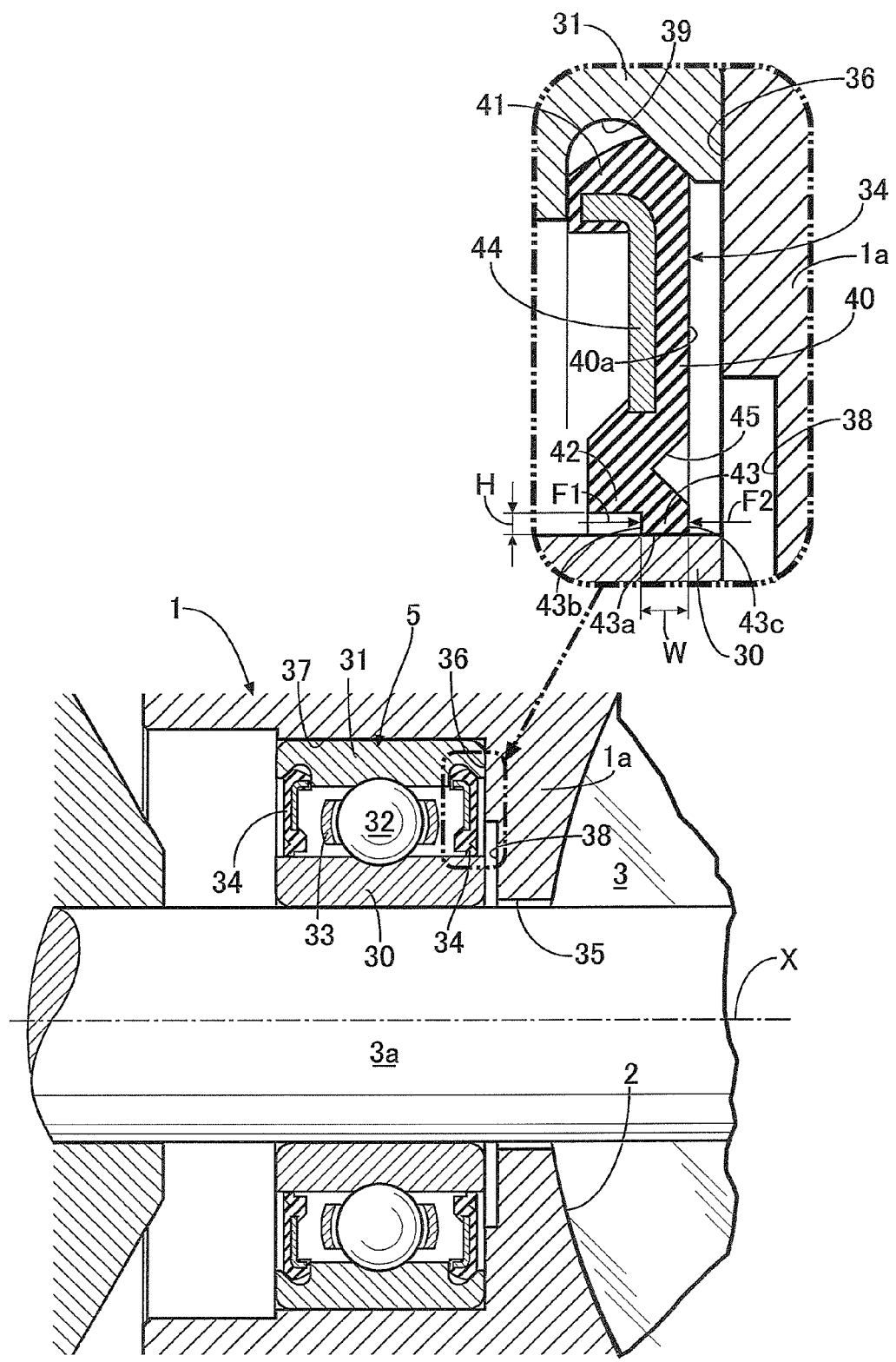
FIG. 3 is a view corresponding to FIG. 2 and showing a second embodiment of the present invention.

Next, a second embodiment of the present invention, which is shown in FIG. 3, will be described.

In the second embodiment, an annular recess portion 45 recessed to immediately above the seal lip 43 is formed in an outer side surface of the lip supporting portion 42 in the seal member 34. The other configurations are the same as those of the aforementioned embodiment, and the portions corresponding to those of the aforementioned embodiment are denoted by the same reference numerals in FIG. 3, and the same description will be omitted.

According to the second embodiment, the supporting stiffness of the lip supporting portion 42 for the seal lip 43 can be appropriately reduced by the depth of the recess portion 45, making it possible to adjust a friction torque between the seal lip 43 and the inner race 30. Therefore, a change in an allowable rotational torque of the valve stem 3a, that is, an allowable rotational torque of the inner race 30 press-fitted and coupled to the valve stem 3a, can be dealt with at the time of changing the specifications of the throttle body 1 or the like.

The present invention is not limited to the above-described embodiments, and various modifications in design may be made without departing from the gist of the present invention. For example, the rolling bearing 5 with seal may be used for supporting a rotary shaft penetrating a partition wall between two chambers having different internal pressures in various kinds of devices other than an intake control device for an engine. Furthermore, the present invention may be applied to a roller bearing having rollers as the rolling members.

What is claimed is:

1. A rolling bearing with seal comprising:
   an inner race;
   an outer race surrounding the inner race;
   a plurality of rolling members arranged circumferentially and interposed between the inner and outer races; and
   a pair of annular seal members disposed between the inner and outer races so as to cover opposite sides of the rolling members,
   wherein an attachment bead to be fixed to the outer race is formed on an outer periphery of each of the seal members,
   wherein a seal lip rotatably and slidably placed in contact with an outer peripheral surface of the inner race is formed on an inner periphery of each of the seal members,
   wherein an annular lip supporting portion having a larger thickness than that of the seal lip is formed on the inner periphery side of each of the seal members,
   wherein the seal lip protruding on an inner peripheral surface of the lip supporting portion of each of the seal members has: a cylindrical seal surface placed in contact with the outer peripheral surface of the inner race; an inner side surface extending from an inner end of the seal surface to the inner peripheral surface of the lip supporting portion; and an outer side surface, at least part of the inner side surface standing upright from the inner end of the seal surface in a direction perpendicular to a generating line of the outer peripheral surface of the inner race, wherein a width of the seal surface in an axial direction is set to be larger than a height of each of the seal lips in a radial direction, wherein the outer side surface of the seal lip stands upright from an outer end of the seal surface in the direction perpendicular to the generating line of the outer peripheral surface of the inner race and reaching the inner peripheral surface of the lip supporting portion, wherein an annular recess portion is formed in a recessed manner at a position immediately above the seal lip in an outer side surface of the lip supporting portion, wherein the inner peripheral surface of the lip supporting portion directly faces and extends substantially parallel to the outer peripheral surface of the inner race and is connected to the upright-standing inner side surface of the seal lip to thereby define a space between the inner peripheral surface of the lip supporting portion and the outer peripheral surface of the inner race, and wherein the annular recess portion is offset from said space in the direction of the generating line of the outer peripheral surface of the inner race when viewed in the direction perpendicular to the generating line.

2. The rolling bearing with seal according to claim 1, wherein the annular recess portion is not overlapped with said space when viewed in the direction perpendicular to the generating line.

* * * * *